United States Patent
Wiggins, Sr. et al.

(10) Patent No.: US 6,761,763 B2
(45) Date of Patent: Jul. 13, 2004

(54) PROCESS FOR COMPACTING CALCINED KAOLIN CLAY

(75) Inventors: William H. Wiggins, Sr., Sandersville, GA (US); Andrea L. Crabb, Sandersville, GA (US); William H. Wiggins, Jr., Warthen, GA (US)

(73) Assignee: Thiele Kaolin Company, Sandersville, GA (US)

( * ) Notice: Subject to any disclaimer, the term of this patent is extended or adjusted under 35 U.S.C. 154(b) by 0 days.

(21) Appl. No.: 10/185,263

(22) Filed: Jun. 26, 2002

(65) Prior Publication Data

US 2004/0000257 A1 Jan. 1, 2004

(51) Int. Cl.[7] ............................................. C04B 14/04
(52) U.S. Cl. ....................... 106/486; 106/484; 106/485; 106/486; 264/338; 264/109; 264/570; 425/405.1; 425/405.2; 53/523
(58) Field of Search ................................. 106/484, 485, 106/486; 264/109, 338, 570; 425/405.1, 405.2; 53/523

(56) References Cited

U.S. PATENT DOCUMENTS

| | | | |
|---|---|---|---|
| 3,586,523 | A | 6/1971 | Fanselow, et al. |
| 4,561,597 | A | 12/1985 | Cook et al. |
| 4,593,860 | A | 6/1986 | Cook et al. |
| 5,074,475 | A | 12/1991 | Suitch et al. |
| 5,129,953 | A | 7/1992 | Suitch et al. |
| 5,328,506 | A | 7/1994 | Crumbley et al. |
| 5,364,579 | A | 11/1994 | Dunaway et al. |
| 6,238,473 | B1 * | 5/2001 | Maxwell et al. ............ 106/486 |

FOREIGN PATENT DOCUMENTS

WO    WO97/42268    11/1997

* cited by examiner

Primary Examiner—C. Melissa Koslow
Assistant Examiner—Shalie Manlove
(74) Attorney, Agent, or Firm—Baker, Donelson, Bearman, Caldwell & Berkowitz

(57) ABSTRACT

Calcined kaolin clay having a high bulk density, improved wet out and slurry incorporation times is produced by using pressure to compact the clay. Other properties of the compacted clay are improved or equivalent to the non-compacted starting calcined clay material.

14 Claims, No Drawings

PROCESS FOR COMPACTING CALCINED KAOLIN CLAY

TECHNICAL FIELD

The present invention relates to calcined kaolin clay. In a more specific aspect, the present invention relates to a process for compacting calcined kaolin clay.

BACKGROUND OF THE INVENTION

Kaolin is a naturally occurring, relatively fine, white clay mineral which may be generally described as a hydrated aluminum silicate. After purification and beneficiation, kaolin is widely used as a filler and pigment in various materials, such as rubber and resins, and in various coatings, such as paints and coatings for paper.

The use of kaolin clay in paper coatings serves, for example, to improve brightness, color, gloss, smoothness, opacity, printability and uniformity of appearance of the coated paper. As a filler in paper formulations, kaolin clay is used to extend fiber and reduce cost and to improve opacity, brightness and other desirable characteristics of the paper product.

Calcined kaolin clay is a particular type of kaolin and is often used in large quantities for paper manufacture. Calcined kaolin can be obtained by heating beneficiated kaolin clay at temperatures of at least 550° C. The calcination step dehydroxylates and converts the kaolin to a noncrystalline aluminosilicate phase. The term "dehydroxylates" refers to the removal of structural hydroxide groups from the kaolin as water vapor. Calcined kaolin has improved light scattering characteristics (as compared to the non-calcined kaolin) and, therefore, contributes a high degree of opacity to the coated paper.

Fanselow et al. U.S. Pat. No. 3,586,523 describes examples of calcined kaolin clay.

Calcined kaolin clay pigments (such as the product marketed by Thiele Kaolin Company of Sandersville, Ga. under the trademark KAOCAL) are widely used in the paper industry. Commonly, calcined clay is blended with hydrous kaolin in the paper mills prior to the manufacture of a finished paper product. These blends are typically comprised of 10–30 parts by weight calcined kaolin and 70–90 parts by weight hydrous kaolin.

During processing, the calcined clay is usually pulverized in a high energy impact mill and then air-classified to remove abrasive particles larger than 325 mesh as these particles tend to cause scratching problems during coating of a paper. The resulting pulverized calcined clay product is fluffy and has a low bulk density when compared to a spray dried hydrous kaolin clay. For example, the bulk density of calcined kaolin is about 10–15 lb/ft$^3$, whereas the bulk density of spray dried hydrous kaolin is about 40–55 lb/ft$^3$.

The fluffy low bulk density calcined clay product can be difficult to handle with conventional bulk handling systems. Therefore, the product is shipped dry in bags, sparger cars (i.e., freight cars) or as an optimally dispersed slurry, typically at about 50% solids. In addition, because the low bulk density of dry calcined clay will commonly require either larger bags or larger volume freight cars when compared to a spray dried hydrous clay, the dry calcined clay is more expensive to ship.

In the industry, efforts have been made to improve the bulk density, dusting and powder flow characteristics of calcined clay. For example, in Suitch et al. U.S. Pat. Nos. 5,074,475 and 5,129,953, an aqueous slurry of calcined clay is spray dried to improve bulk density and flowability. However, this spray dried material tends to create dust and can be difficult to handle in bulk and is expensive to dry due to the energy costs associated with spray drying.

Cook et al. U.S. Pat. Nos. 4,561,597 and 4,593,860 increase the bulk density of calcined clay by dry ball milling calcined clay powder, but the flowability of the powder remains poor. Furthermore, the dry ball milling step needs to be followed by pulverizing in a high-energy impact mill to minimize slurry screen residue. However, pulverizing after the dry ball milling step may also result in a product with a lower bulk density.

Dunaway et al. U.S. Pat. No. 5,364,579 pelletizes calcined clay using a pan pelletizer or pin mixer in the presence of 1% ammonia vapor to improve flowability. This process does not use water and, therefore, eliminates the use of an energy intensive drying step. However, the Dunaway et al. patent does not disclose any improvements in bulk density or integrity of the pellets compared to the original feed calcined clay.

Crumbley et al. U.S. Pat. No. 5,328,506 discloses a process in which calcined clay is kneaded to form dough-like agglomerates using 1–30% moisture. The claimed advantages of this process are that the product is shipped without drying and is dust free, resists break down to dust during shipping and is capable of being dispersed in water when agitated using conventional make down equipment. However, this process does not use any pressure for agglomeration, and consequently the agglomerated moistened calcined clay product even when combined with up to 30% hydrous clay does not show an improved bulk density.

Munsterman et al. International Patent Publication No. WO 97/42268 describes a process for producing a free flowing, dust free and high bulk density material using a mixture of water (20–48 percent) and calcined clay, followed by pelletizing in a disc pelletizer and then drying to a moisture content of 2 percent. The bulk density of the agglomerated product is reported to be about 30 lb/ft$^3$. The disc pelletizer forms rounded agglomerates by tumbling action, and no external pressure is applied. Consequently, the resulting agglomerated product is expected to be relatively weak. More importantly, the production costs of this process are high due to the expense of the drying step.

A process for the manufacture of high bulk density agglomerates from a mixture of calcined kaolin clay, hydrous kaolin clay and water is disclosed in Maxwell et al. U.S. Pat. No. 6,238,473. In this process, the mixture is subjected to high pressure in a compaction system.

Consequently, there is a need in the industry for a process by which calcined clay can be compacted to provide a high bulk density product which can be packaged in bulk for handling and transporting in conventional systems and which has low screen residue, while still retaining the optical properties which are desirable for paper coating and filling applications, but without the addition of either water or hydrous kaolin clays.

SUMMARY OF THE INVENTION

Briefly described, the present invention provides a process for compacting calcined kaolin clay. The compacted clay of this invention allows for optimal or maximum weight loading of conventional shipping containers and exhibits properties which are either equivalent to or improved over the corresponding properties of the starting non-compacted calcined kaolin clay.

Accordingly, an object of this invention is to provide a process for compacting calcined kaolin clay.

Another object of this invention is to provide a process for compacting calcined kaolin clay in which the compacted clay has a high bulk density.

Another object of this invention is to provide a process for compacting calcined kaolin clay in which the compacted clay has improved wettability.

Another object of this invention is to provide a process for compacting calcined kaolin clay in which the compacted clay has an improved time for slurry incorporation.

Another object of this invention is to provide a process for compacting calcined kaolin clay in which the compacted clay can be packaged for optimal or maximum weight loading of a conventional shipping container.

Still another object of this invention is to provide a process for compacting calcined kaolin clay in which the compacted clay has a low 325 screen mesh residue.

Still another object of this invention is to provide a process for compacting calcined kaolin clay in which the compacted clay retains good rheological properties.

Still another object of this invention is to provide a process for compacting calcined kaolin clay in which the compacted clay retains good optical properties.

These and other objects, features and advantages of this invention will become apparent from the following detailed description.

DETAILED DESCRIPTION OF THE INVENTION

In accordance with the present invention, calcined kaolin clay is compacted to a high bulk density which is in the range of about 25 to about 40 pounds per cubic foot, preferably at least about 30 pounds per cubic foot. The compacted clay has additional advantages over the non-compacted starting clay material, including improved wet out and slurry incorporation times.

Other properties of the compacted clay of this invention are either improved or equivalent to the corresponding properties of the non-compacted starting clay material, including optical and rheological properties.

The compacted calcined kaolin clay of this invention is produced by a process which comprises the steps of (A) applying pressure in the range of about 25 to about 450 pounds per square inch to a non-rigid fabric container of non-compacted calcined kaolin clay, to compact the clay to a bulk density of about 25 to about 40 pounds per cubic foot, wherein the container is positioned in a rigid ventilated structure and (B) removing the container of compacted clay from the rigid ventilated structure.

In the above-described process, the non-rigid fabric container can be substantially filled with the non-compacted calcined kaolin clay either before or after the container is positioned in the rigid ventilated structure. Alternatively, the container can be partially filled with non-compacted clay before the container is positioned in the structure, and then the filling can be completed after the container is positioned in the structure. However, the compacting step will be performed after the container of clay is placed in the structure. Additionally, the non-rigid fabric container which is substantially filled with non-compacted clay can be closed either before or after the compacting step, but preferably the container is closed before the compacting step.

As stated above, the starting material for the process of this invention is a non-compacted calcined kaolin clay, such as the product marketed under the trademark KAOCAL by Thiele Kaolin Company, Sandersville, Ga.

The container used to receive the starting clay material is preferably a fabric bag, such as the fabric bags conventionally used in the packaging of non-compacted calcined clay. The container is non-rigid (i.e., flexible) and allows the escape of air during the compacting step. If a coated container is used, the coating must not prevent the escape of air, but must at least substantially prevent the loss of clay during the compacting step.

The non-rigid container has closed sides, an open portion to receive the starting clay material and a closed portion opposite the open portion.

The structure used to receive the non-rigid container is preferably a rigid (i.e., non-flexible) ventilated structure. Rigidity is necessary so that the structure can hold the container of starting clay material in a substantially uniform shape and size during and after the compacting step. This structure, which can be steel or other rigid material, is sometimes referred to as a "press box".

The rigid structure has closed sides, an open portion for alignment with the open portion of the container and a closed portion for alignment with the closed portion of the container. The open portion of the structure allows the container (with or without the non-compacted starting clay material) to be positioned within the structure and in substantial alignment with the structure.

The closed sides of the rigid structure may be hinged to facilitate placing the container of non-compacted starting clay material into the press box and to facilitate removing the container of compacted clay material from the press box.

In a preferred but optional alternative in this process, the sides of the rigid structure can contain one or more slots near the closed portion. Each slot has a corresponding slot on an opposite side. Through each slot on a side (and continuing through the corresponding slot on the opposite side) is passed a reinforcing band which is used to secure the finished container of compacted clay. Thus, the length of each band must be sufficient to encompass the finished container. The width and thickness of the bands are not critical, but the band should not cut into or otherwise damage the container.

As noted above, the rigid structure is ventilated, which allows the escape of air which is released from the container during the compacting step.

In another preferred but optional alternative in this process, a semi-rigid member made of plastic, cardboard or other suitable semi-rigid material is positioned in the closed portion of the rigid structure. The principal functions of this member are to provide strength to the filled container of compacted clay and to further protect the filled container from the reinforcing bands (if such bands are used). Preferably, the dimensions of this member substantially conform to the dimensions of the closed portion of the rigid structure. The reinforcing bands are positioned along the outer surfaces of the semi-rigid member.

Preferably after the non-rigid fabric container is positioned within the rigid structure, the container is substantially filled with the starting non-compacted clay material. After the filling step, pressure is applied to compact the clay. The amount of pressure is within the range of from about 25 to about 450 pounds per square inch, preferably at least about 30 pounds per square inch. Preferably, the pressure applied to compact the clay is hydraulic pressure, but other sources of pressure can also be used in this invention.

As noted above, the container can be substantially or partially filled with the non-compacted clay prior to placing the container in the structure. If partially filled, the filling step will be completed after the container is placed in the structure.

The time and pressure of the compacting step are dependent upon the characteristics of the starting non-compacted clay material and the desired characteristics of the compacted clay product.

Although the container can be closed after the clay is compacted, preferably the container is closed before the clay is compacted. After the compacting step is completed, the reinforcing bands are closed and tightened around the closed container if such bands are used. The filled and closed container of compacted clay is then removed from the structure for subsequent shipping.

If reinforcing bands are used, the pressure (for compacting the clay) is maintained while the bands are tightened and then released after such tightening. If reinforcing bands are not used, the filled and closed container of compacted clay is removed from the structure for subsequent shipping or other handling procedure.

Conventional containers for non-compacted calcined kaolin clay can be used for the compacted clay of this invention. Having a bulk density of at least about 25 pounds per cubic foot, the compacted clay of this invention, when packaged in these conventional containers, provides optimal or maximum weight loading of such container, thereby providing more clay in each container (i.e., more tons of clay per container).

Additionally, we have unexpectedly found that certain properties of the compacted clay are improved or equivalent to the corresponding properties of the non-compacted calcined clay starting material. A comparison of these properties is shown in Table I.

TABLE I

|  | Compacted KAOCAL | Non-Compacted KAOCAL |
| --- | --- | --- |
| Brightness | 92.9 | 92.5–93.5 |
| % 325 m Residue | 0.0012% | <0.0100% |
| % <2 µm | 87.6% | 86.0–89.0% |
| pH | 5.8 | 5–6 |
| Abrasion | 20.8 mg/100 K rev | 15–21 mg/100 K rev |
| Bulk Density | 34.4 #/ft$^3$ | 12–16 #/ft$^3$ |
| ∢ of Repose (test) | 33° | 40° |
| Wet Out Time | 30 seconds | 218 seconds |
| Slurry Incorporation Time | 2:30 | 3:20 |
| Slurry solids | 50.3% | 50.2% |
| Brookfield Viscosity | 275 cps | 278 cps |
| Hercules Viscosity | 702 rpm | 586 rpm |
| pH (slurry) | 6.85 | 6.90 |
| Scatter Coefficient | 1.3463 | 1.25–1.35 |
| Surface Area | 15.8 m$^2$/g | 15–17 m$^2$/g |

In Table I, any ranges (when shown) are typical for the non-compacted KAOCAL product. Other individual values were measured for the compacted and non-compacted KAOCAL products.

For the purposes of this application, the following terms will be understood as follows:

Bulk Density—refers to the mass per unit volume, generally in grams per cubic centimeter or pounds per cubic foot. In this invention, the compacted calcined kaolin clay has a high bulk density (at least about 25 lbs./cu. ft., preferably at least about 30 lbs./cu. ft.).

To determine bulk density, the volume of the container is determined using length, width and height dimensions; the weight of the container of compacted clay is determined; and these values are then converted to pounds per cubic foot.

Wet Out Time—refers to the ease with which a calcined kaolin clay can be admixed with water. A wet out test consists of processing 100 grams of tap water into a 600 ml. beaker, after which 50 grams of calcined kaolin clay are poured into the beaker while simultaneously starting a stopwatch. At the point when all of the clay has disappeared under the surface of the water, without any agitation, the time is noted and expressed in terms of seconds.

325 Mesh Screen Residue—refers to the amount of material which is retained on a 325 mesh screen when screened in slurry form; refer to TAPPI Method No. 681. In this invention, the residue is less than about 0.01 percent (i.e., a low 325 mesh screen residue).

Optical Properties—also referred to as opacity or light scattering ability; determined by the scattering coefficient, which is measured by the method described in TAPPI, 1978, Vol. 61, No. 6, pages 78–80.

Brookfield and Hercules Viscosities—determined by TAPPI Method No. T-648-OM-97-as revised in 1997. This method sets forth specific procedures for determination of Brookfield (low shear) and Hercules (high shear) viscosities.

In addition, by the term "good optical properties", we mean that the products of this invention can be effectively used in those applications when opacity is a desired feature, such as in paper coatings. By the term "good rheological characteristics", we mean that the products of this invention (a) have a viscosity (i.e., flow characteristics) which enables such products to be used in coatings which can be worked, pumped and/or coated by means which are conventional in the paper industry and (b) have a viscosity which is at least equivalent to the viscosity of the starting non-compacted calcined clay material.

In the preferred embodiment of this invention, the container of compacted clay is substantially dimensionally stable and does not significantly decrease in bulk density with time and/or handling of the container. Table II indicates the dimensional stability (i.e., size) and bulk density of three containers of calcined clay which has been compacted according to the process of this invention. In Table II, the terms "1 day", "2 days" and "7 days" refer to the time when the size and bulk density values were determined after each container of compacted calcined clay was produced.

TABLE II

| Sample | Banded Size | Banded Bulk Density | Banded Size | Banded Bulk Density |
| --- | --- | --- | --- | --- |
| A | 13 × 10¼ × 11¼ (1 day) | 30.9 #/cft (1 day) | 13¼ × 10¼ × 11½ (7 days) | 29.7 #/cft (7 days) |
| B | 13¼ × 10½ × 10½ (1 day) | 31.4 #/cft (1 day) | 13⅜ × 10½ × 10¾ (2 days) | 30.3 #/cft (2 days) |
| C | 13½ × 10¼ × 10½ (1 day) | 31.4 #/cft (1 day) | 13½ × 10¼ × 10¾ (1 day) | 30.7 #/cft (1 day) |

This invention has been described in detail with particular reference to certain embodiments, but variations and modifications can be made without departing from the spirit and scope of the invention as defined in the following claims.

What is claimed is:

1. A process for the compacting of calcined kaolin clay, wherein the process comprises the sequential steps of:

A. applying pressure in the range of about 25 to about 450 pounds per square inch to a container of non-compacted calcined kaolin clay wherein the clay is compacted to a bulk density of about 25 to about 40 pounds per cubic foot, wherein the container is a non-rigid fabric container having closed sides, an open portion and a closed portion opposite the open portion;

wherein the container is positioned in a rigid ventilated structure having closed sides, art open portion for alignment with the open portion of the container and a closed portion for alignment with the closed portion of the container;

wherein the container is in substantial alignment with the structure; and

B. removing the container of compacted calcined kaolin clay from the structure.

2. A process as defined by claim 1 wherein the non-rigid fabric container is substantially filled with non-compacted calcined kaolin clay after the container is positioned in the rigid structure.

3. A process as defined by claim 1 wherein the non-rigid fabric container is partially filled with non-compacted calcined kaolin clay prior to positioning the container in the rigid ventilated structure.

4. A process as defined by claim 3 wherein the filling step is completed after the container is positioned in the rigid ventilated structure.

5. A process as defined by claim 1 wherein the clay is compacted to a bulk density of at least about 30 pounds per cubic foot.

6. A process for the compacting and packaging of calcined kaolin clay, wherein die process comprises the sequential steps of:

A. applying pressure in the range of about 25 to about 450 pounds per square inch to a container of non-compacted calcined kaolin clay wherein the clay is compacted to a bulk density of about 25 to about 40 pounds per cubic foot, wherein the container is a non-rigid fabric container having closed sides, an open portion and a closed portion opposite the open portion;

wherein the container is positioned in a rigid ventilated structure having closed sides, an open portion for alignment with the open portion of the container and a closed portion for alignment with the closed portion of the container;

wherein the container is in substantial alignment with the structure; and

B. removing the container of compacted calcined kaolin clay from the structure and securing the container of compacted clay with a plurality of reinforcing bands.

7. A process as defined by claim 1 wherein a semi-rigid member is placed in the closed portion of the rigid ventilated structure and substantially conforms to the dimensions of the closed portion of the structure.

8. A process as defined by claim 1 wherein the pressure applied to compact the calcined kaolin clay is hydraulic pressure.

9. A process as defined by claim 1 wherein the closed sides of the rigid ventilated structure are hinged.

10. A process as defined by claim 1 wherein the container of non-compacted calcined kaolin clay is closed before the clay is compacted.

11. A process as defined by claim 1 wherein the container is closed after the clay is compacted.

12. A process as defined by claim 6 wherein the pressure is maintained while the reinforcing bands are closed and tightened round the closed container of compacted calcined kaolin clay.

13. A compacted calcined kaolin clay having a bulk density of about 25 to about 40 pounds per cubic foot and improved wettability and slurry incorporation times when compared to calcined kaolin clay in a non-compacted form and wherein the compacted calcined kaolin clay has a screen residue of less than about 0.01 percent.

14. A compacted calcined kaolin clay as defined by claim 13 wherein the compacted clay has a bulk density of at least about 30 pounds per cubic foot.

* * * * *